Jan. 23, 1940. J. J. MADER Re. 21,332
MELTING FURNACE
Original Filed Jan. 3, 1935
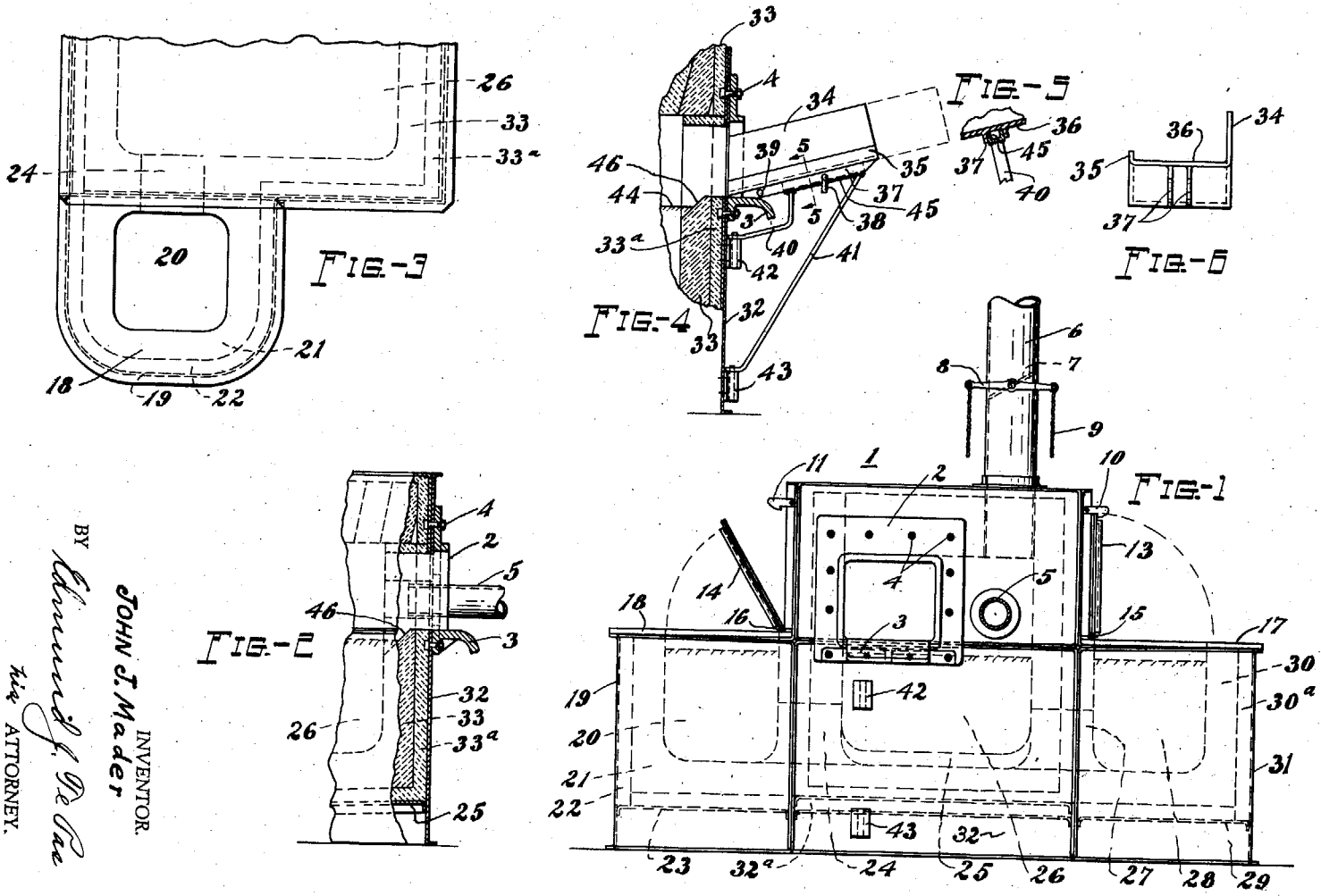
INVENTOR.
JOHN J. Mader
BY Edmund J. De Pas
his ATTORNEY.

Reissued Jan. 23, 1940 Re. 21,332

UNITED STATES PATENT OFFICE 21,332

MELTING FURNACE

John J. Mader, Parma, Ohio, assignor to The Apex Electrical Manufacturing Company, Cleveland, Ohio, a corporation of Ohio Original No. 2,074,115, dated March 16, 1937, Serial No. 256, January 3, 1935. Application for reissue November 3, 1939, Serial No. 302,751

8 Claims. (Cl. 266—33)

This invention relates to improvements in melting furnaces and in particular furnaces used for melting non-ferrous metals and their alloys in connection with die casting or permanent molding apparatus.

One of the objects of this invention is to provide a melting furnace having a chamber with a working opening by way of which to ladle or otherwise remove molten metal in which substantially all slag or dross has been removed from the surface of the metal prior to its admission to such chamber.

Another object of the invention is to provide a melting furnace arranged to permit several workmen to safely and simultaneously remove molten metal from the furnace without interfering with each other whereby several molds may be efficiently operated at the same time with metal supplied from a single furnace.

Another object of the invention is to provide a melting furnace in which the dross or other impurities of the metal are confined to one chamber or locality in the furnace from which it may be easily and readily removed without interference to the withdrawal of metal from the furnace.

Another object of the invention is to provide a melting furnace of high efficiency in which there is a great saving in fuel consumption.

Another object of the invention is to provide a melting furnace constructed in such a manner that parts which are most subjected to deterioration or wear may be easily repaired or replaced.

A further object of the invention is to provide a melting furnace which is relatively inexpensive both to construct and to keep in repair.

With these and other objects in view, the invention consists in the novel construction, arrangement and combination of parts, hereinafter illustrated and described in some of its embodiments in the accompanying drawing and particularly pointed out in the appended claims.

In the drawing accompanying and forming a part of this specification, Figure 1 is a side elevational view of the rear of a furnace illustrative of the invention; Figure 2 is a detail sectional view of one end of the furnace with certain of the parts broken away for the purpose of showing the charging opening of the furnace; Figure 3 is a fragmentary plan view of part of the top of the furnace; Figure 4 is a detail sectional view similar to Figure 2 illustrating the charging device of the furnace; Figure 5 is a detail sectional view taken on line 5—5 of Figure 4; and Figure 6 is an end elevational view of the charging chute.

The furnace disclosed herein for purpose of illustrating one mode of practicing this invention is indicated generally by the numeral 1 and it is in the form of a hollow, closed structure having a material charging opening at the rear thereof defined by a rectangular frame 2 at the bottom of which is located a ledge or sill extending away from the furnace and terminating in a down-turned edge or lip 3. The frame 2, which is subjected to considerable wear in the use of the furnace, is detachably secured to the furnace by bolts 4 so that when worn out it may be readily removed and replaced by a new frame.

Heat may be supplied to the interior of the furnace by means of a fluid fuel burner 5, or if desired, electrical heaters (not shown) could be used as well, particularly in localities where the cost of electrical power compares favorably with gas and fuel oils. The heated gases may be vented from the interior of the furnace by way of a flue 6, controlled by a damper 7 having operating arms and cords or chains 8 and 9 respectively, by means of which the damper may be manipulated.

Pivoted catches 10 and 11 are provided for holding the lids 13 and 14 respectively, in an upright or open position with respect to certain openings in the furnace which they are arranged to cover. These lids are pivoted at 15 and 16 respectively, at one side of the openings formed in the apertured top plates 17 and 18 respectively, and they are preferably lined with a refractory heat insulating material so as to reduce the transfer of heat therethrough.

Ladling or dipping chambers 20 and 28 of similar construction are provided at the opposite ends of the furnace for the ladling of molten metal out of the furnace. The chamber 20 is formed by an outer wall 19 and a bottom wall 23 of heavy gauge sheet metal having refractory linings 21 and 22, the former of which is in contact with the molten metal in the furnace. Access to the chamber 20 is had by way of the aperture provided in the top plate 18 when its lid 14 is in its open position.

The chamber 20 communicates with the main or melting chamber 26 of the furnace by means of an aperture or passageway 24 located at the lower level of the furnace with its top located at a considerable distance below the level of the molten metal in the furnace. By reason of this arrangement, heated gases and impurities in the form of dross and slag floating on the metal are retained in the main chamber of the furnace, which is supplied with heat by way of the burner 5.

A dipping chamber 28 and communicating passageway 27 similar to those just described for one end of the furnace, are provided at the other end of the furnace. The floor 25 of the main chamber 26 is slanted downwardly in a direction towards the front of the furnace so as to permit molten metal to flow continuously away from the charging end of the furnace to its point of removal at the chambers 20 and 28.

The chamber 28 is formed by a bottom wall 29 and side walls 31 of sheet metal with refractory linings 30 and 30ᵃ similar to the linings 21 and 22 of the chamber 20. The apertured top plate 17 and lid 13 of the chamber 28 are also substantially identical with the plate 18 and lid 14 of the chamber 20. As shown best in Figure 2, the sides 32 and bottom 32ᵃ of the melting chamber 26 too are formed from heavy gauge sheet metal with refractory linings 33 and 33ᵃ, the former being exposed to the molten metal and gases in the compartment 26.

An inclined chute having side walls 34 and 35 and a bottom 36 is provided for discharging materials into the melting chamber 26 by way of the opening defined by the frame 2. The side 35 is lower than the side 34 so as to facilitate the operation of shoveling onto the chute materials to be fed to the furnace. Ribs 37 define a channel or guideway at the underside of the chute for reception of a support 45 carried at one end of the rods 40 and 41, the other ends of which are pivoted from brackets 42 and 43 carried by the rear wall of the furnace.

Aligned holes are provided in the support 45 and channels 37 for reception of a removable locking pin or rod 38 which serves to hold the chute in the full-line position shown in Figure 4. Upon removal of the pin 38 the chute may be shifted to the broken line position shown in Figure 4 and held in such position by inserting the pin 38 in the holes 39 of the channel members 37 and the holes provided for its reception in the support 45, whereupon the chute may be swung to one side of the opening of the frame 2 and the slag and dross may be skimmed from the surface of the metal in the melting chamber 26 and raked up the inclined edge 46 of the wall 33 and over the projecting lip 3 beneath which a container (not shown) may be placed for catching the slag as it is removed from the furnace.

In the operation of the furnace, it is first loaded with metal and the burner 5 is then ignited. As molten metal is taken from the furnace, ingot or scrap metal is laid upon the inclined chute at the rear of the furnace and the exhaust gases and heat which would otherwise be wasted, serve to preheat the metal to be charged into the furnace. When considerable scrap metal is fed to the furnace at one time, a great deal of smoke and gases are evolved which may be withdrawn through the flue 6 by opening the damper 7 by means of the arms 8 and cords 9.

It will thus be seen that in the use of this furnace, heat which is ordinarily wasted is utilized to preheat and at least partly melt down the metal to be fed into the furnace. Economies in fuel are also realized by reason of having a plurality of working openings or dipping chambers for the removal of molten metal all connected to a single melting chamber having only the incident heat losses of one furnace and requiring the use of only one burner.

As has been previously stated, the passageways connecting the melting chamber with the dipping chambers are located sufficiently below the top level of the molten metal so as to permit clean metal only to flow into the dipping chambers and the dross and slag which floats to the top of the metal in the melting chamber will be retained therein. By reason of having only clean metal in the dipping chambers, the metal may be removed by ladling without requiring even infrequent skimming. In permanent molding or in a die casting process, it is particularly objectionable to have any dross or other impurities get into the mold or die which will result in imperfect castings.

By reason of the provision of a plurality of working openings for the furnace, it is possible to efficiently operate several molding devices, and the attendants for each device will have ample room in which to work so that accidental spilling of molten metal through interference between workmen will be minimized. The rounded corners of the outer jackets of the dipping chambers reduce the danger of the clothing of the attendants being caught on the furnace.

The furnace disclosed herein is shown as having two separate openings from which molten metal may be removed. It is within the contemplation of the invention to increase the number of such openings to three or more if desired. By using a sheet metal outer casing such as shown, additional working openings may be easily added to the furnace. The use of a sheet metal casing also facilitates the installation of the refractory lining and by use of a double lining, the cost of upkeep of the furnace is greatly reduced as the inner lining only ordinarily is subject to wear and replacement. It is preferred to form the inner lining of the furnace from a refractory brick capable of withstanding the treatment to which it is subjected to in the use of the furnace and the lining between the refractory brick and the sheet steel walls of the furnace is preferably formed from a ground or powdered refractory material which may be composed of ganister and powdered asbestos so that the lining provides a cushioned backing for the refractory brickwork whereby such brickwork is not subjected to strains due to the thermal expansion and contraction in the different parts of the furnace.

Another feature of this furnace which tends to increase its operating efficiency is that of having the burner 5 arranged so as to direct its flame against a wall of the furnace at a point some distance from the dipping chambers 20 and 28 so that the walls common to the melting and the dipping chambers are at a lower temperature than some of the other walls of the furnace. With the furnace arranged in this manner it is possible to maintain relatively high temperatures in certain portions of the melting chamber to insure the rapid melting of the materials therein while at the same time maintaining the temperature of the materials in the melting chamber at a proper temperature for molding operations, which temperature is somewhat lower than the temperature considered best for the rapid melting of the metal.

By referring to Figure 1, it will be seen that the sheet metal casing of the furnace is formed from four different main sections which include the sections defining the dipping chambers 20 and 28; the section defining the lower part of the melting chamber 26; and the section thereabove which defines the combustion chamber of the furnace. These sheet metal sections may, if desired, be secured together in a detachable manner by means of bolts (not shown) and it is also within the contemplation of this invention to detachably secure the top plates 17 and 18 of the dipping chambers in a similar manner. This arrangement greatly facilitates repair work in the different portions of the furnace by reason of the fact that different sections of the furnace may be removed one from the other.

Furthermore, it is to be understood that the particular forms of melting furnace shown and described, and the particular procedure set forth are presented for purposes of explanation and that various modifications of said apparatus and procedure may be made without departure from this invention as described in the appended claims.

Having thus described my invention, what I claim is:

1. A metal melting furnace for non-ferrous metals having a melting chamber, means for supplying heat to said chamber including a burner adapted to impinge a flame against a wall of the melting chamber, said furnace having an opening located in a wall opposite to the first-named wall of the melting chamber for the supplying of metal to the melting chamber, and means for supporting a supply of metal to be fed to the furnace in a position adjacent to the stated opening so that such metal is subjected to radiant heat from the interior of the furnace.

2. A metal melting furnace for non-ferrous metals having a melting chamber, means for supplying heat to said chamber including a burner adapted to impinge a flame against a wall of the melting chamber, said furnace having an opening located in a wall opposite to the first-named wall of the melting chamber for the supplying of metal to the melting chamber, means for supporting a supply of metal to be fed to the furnace adjacent to the stated opening comprising an inclined chute discharging into the said furnace opening, arranged so that such metal is subjected to radiant heat from the interior of the furnace.

3. A melting furnace for non-ferrous metals having a melting chamber in the form of a sheet metal outer casing with an inner refractory lining, means for supplying heat to said chamber, a frame-work defining a metal charging opening with a shelf extending away from the furnace and terminating in a down-turned lip detachably secured to a side of the furnace, and a displaceable chute at the side of the furnace inclined so as to discharge into said opening.

4. A metal melting furnace for non-ferrous metals having a melting chamber, means for supplying heat to said chamber including a burner adapted to impinge a flame against a wall of the melting chamber, said furnace having an opening located in a wall opposite to the first-named wall of the melting chamber for the supplying of metal to the melting chamber, means for supporting a supply of metal to be fed to the furnace adjacent to the stated opening comprising a chute adapted for holding said supply of metal in position where it is exposed to the radiant heat generated in the melting chamber of the furnace.

5. A metal melting furnace having a melting chamber with an opening for supplying metal to the melting chamber, means for supplying heat to said chamber, and means pivoted to the furnace for holding a supply of metal to be fed to the furnace in a position adjacent to the stated opening thereof which it is subjected to the heat generated by the furnace, said last-named means being adapted to be swung away from such opening to permit better access thereto.

6. A metal melting furnace having a melting chamber, means for supplying heat to said chamber, and means for feeding metal to said chamber comprising an opening in the furnace, a chute adjacent to said opening and a support therefor pivoted for movement about a vertical axis and slidably supporting said chute.

7. A metal melting furnace for non-ferrous metals having a melting chamber, means for supplying heat to said chamber including a burner adapted to impinge a flame against a wall of the melting chamber, said furnace having an opening located in a wall opposite to the first-named wall of the melting chamber for the supplying of metal to the melting chamber, means for supporting a supply of metal to be fed to the furnace comprising a chute arranged on an incline adjacent the said furnace opening so that such metal is preheated and any molten metal in such supply will be fed into the furnace.

8. A sheet metal casing for a melting furnace for non-ferrous metals comprisings a plurality of detachably associated units having generally rectangular cross-sectional areas, one of such units defining the top and upper sidewalls of the melting chamber of the furnace, another of such units defining a dipping chamber alongside of and communicating with the melting chamber.

JOHN J. MADER.